United States Patent

[11] 3,596,737

[72] Inventor Victor F. Volk
 New York, N.Y.
[21] Appl. No. 840,755
[22] Filed July 10, 1969
[45] Patented Aug. 3, 1971
[73] Assignee Anaconda Wire and Cable Company

[54] BRAKING APPARATUS
 14 Claims, 7 Drawing Figs.
[52] U.S. Cl. .................................................. 188/1 R,
 188/77 W, 188/83
[51] Int. Cl. .................................................. F16d 63/00
[50] Field of Search............................................ 188/1, 82.6,
 83, 77 W; 74/224

[56] References Cited
UNITED STATES PATENTS
439,128 10/1890 Durkee.......................... 74/224 X
636,771 11/1899 Duquette....................... 188/77 W X
FOREIGN PATENTS
671,258 8/1929 France .......................... 74/224

Primary Examiner—George E. A. Halvosa

ABSTRACT: A brake or tensioning device does not rely on friction to absorb energy but absorbs energy by the elongation of an endless strand passing from a smaller to a larger capstan. The strand is continuously relaxed in passing back again to the smaller capstan.

Patented Aug. 3, 1971

INVENTOR.
V F Voel(

Patented Aug. 3, 1971

INVENTOR.
J.F. Volk

INVENTOR.

V. F. Volk

BRAKING APPARATUS

BACKGROUND OF THE INVENTION

Many industrial operations require the application of a controlled retarding or braking force to some moving strand or member. Examples of such operations include the stringing of overhead cables, wrapping of helical tapes or wires under tension, chock absorption of the chassis of vehicles, deceleration of aircraft when landing on a limited runway, and many others. The most common braking method, as exemplified by the drum or disk brakes on automobiles, comprises the absorption of energy in mechanical friction. This is true, also, with regard to the shock absorbing effect of leaf springs. Hydraulic shock absorbers and dashpots are also used to apply braking forces but only over short distances or durations. The use of conventional frictional braking of long duration or distance has the objection that it inherently involves abrasive wearing of the contacting surfaces so that brake bands must be periodically replaced. This wearing is associated with changes in the worn surface and its frictional coefficient so that in industrial operations where a closely controlled tension is required the application of such tension by friction brakes has been largely superseded by electrical braking means such as torque motors. Torque motors are conventionally used to control the tension of strands paying into cabling machines and of insulating tapes being wound around cable cores, since in these applications precise control of tension must be applied during long passages of the strands or tapes. Torque motors, however, are relatively expensive and complex devices, and this is disadvantageous, particularly when large numbers are required for a single operation.

SUMMARY OF THE INVENTION

I have invented a braking apparatus essentially free from the generation of frictional heat comprising an endless strand, first and second capstan means each engaging a sufficient length of the strand to prevent slippage, first guide means guiding the strand to pay off of the first capstan means and be taken up by the second capstan means, and second guide means guiding the strand to pay off of the second capstan means and be taken up by the first capstan means. My apparatus comprises means driving the first and second capstan means at a surface speed greater for the second capstan means than for the first capstan means thereby straining the strand leaving the second capstan means and permitting relaxation of the strand leaving the second capstan means. Preferably my apparatus also comprises tensioning means applying tension to the strand being taken up by the first capstan means and the capstan means of may invention may advantageously comprise coaxial cylinders having a common angular speed but different diameters. The endless strand of my apparatus which may comprise a helical spring is elastic within a limit of strain and this limit is not exceeded in the strand leaving the first capstan means, or elsewhere in my apparatus.

In the above-described embodiment of my invention comprising coaxial cylinders the strand may advantageously be wound with a different direction of lay on each of said cylinders. The strand may also be wound with the same direction of lay on both capstan cylinders, in which case my apparatus may advantageously comprise means for preventing the rotation of the cylinders in one direction.

In another embodiment my apparatus, essentially free from the generation of frictional heat, comprises an endless strand, which may be a helical spring, first and second cylindrical capstans that are rotatably mounted on parallel axes and means for rotating these capstans. Gear means connect the first and second capstans in such a manner that when they are rotated the surface speed of the second capstan exceeds the surface speed of the first capstan. The strand is wrapped around both capstans so as to advance under high tension from the first to the second capstan and return under low tension from the second to the first, thereby braking the rotation of the capstans. For use with a helical spring the capstans may advantageously have lengthwise surface ridges with the ridges on the second capstan spaced wider than the ridges on the first capstan.

A more thorough understanding of my invention may be gained from a study of the appended drawing.

DETAILED DESCRIPTION OF PREFERRED EMBODIMENTS

Figure 1:
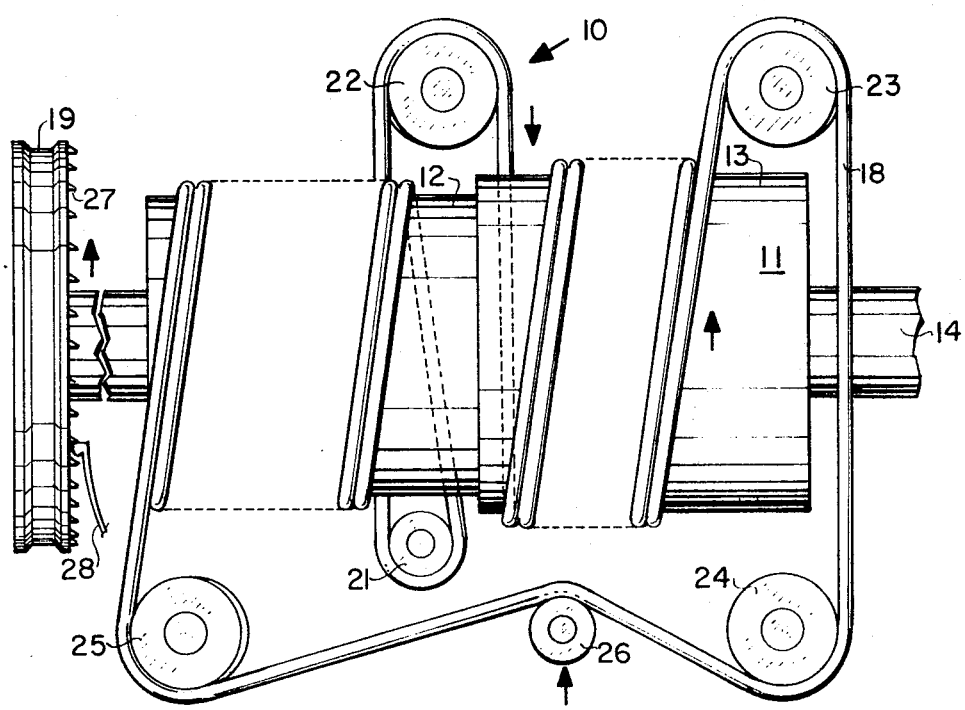
FIG. 1 shows a side view of an apparatus of my invention.
Figure 2:
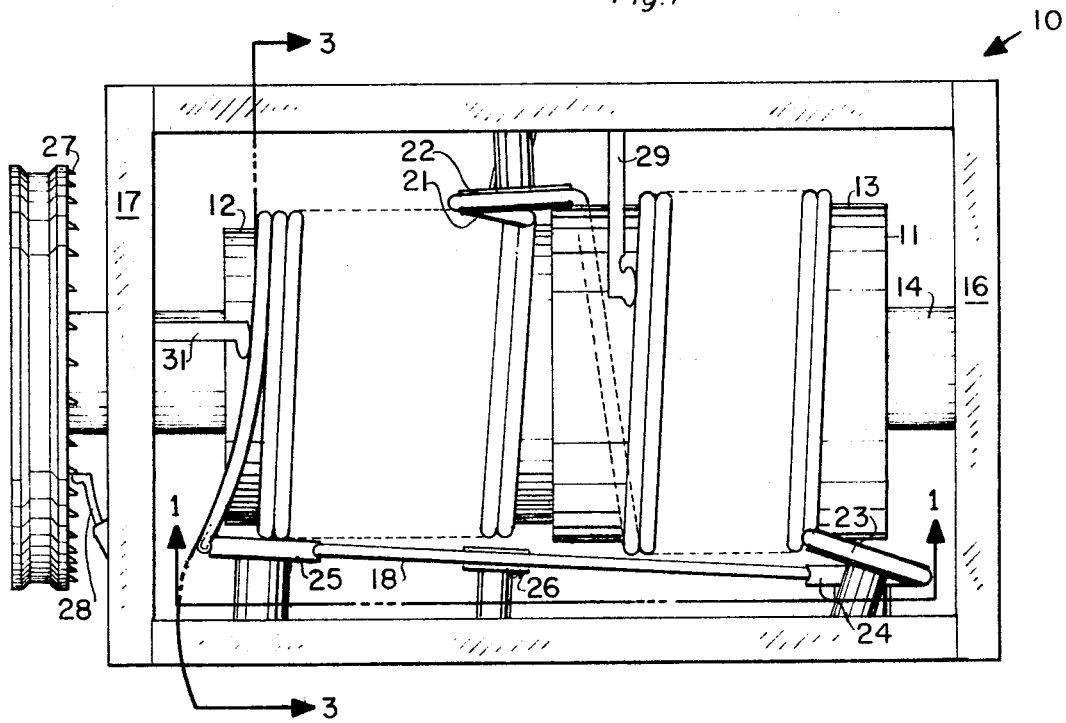
FIG. 2 shows a plan view of the apparatus of FIG. 1.
Figure 3:
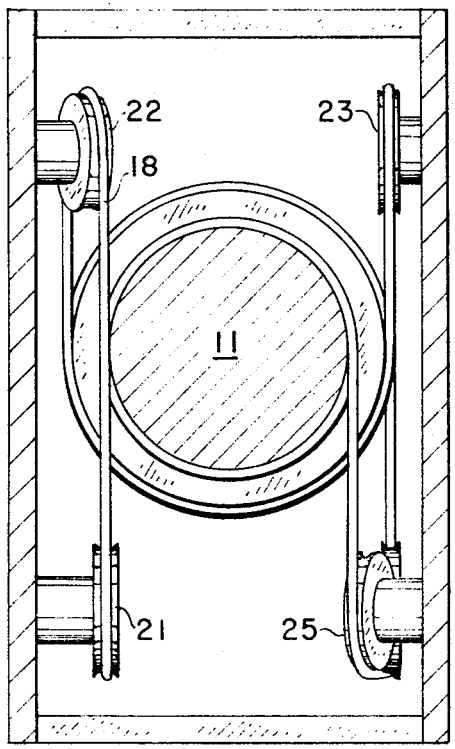
FIG. 3 shows a view through the line 3-3 of FIG. 2.

Referring first to the apparatus of FIGS. 1, 2 and 3 indicated generally by the numeral 10 a cylinder 11 has been machined down for half its length to form 2 coaxial capstan surfaces 12 and 13 which are mounted on a shaft 14 in bearings in upright members 16, 17 to rotate as a single unit.

For small sized apparatus the shaft 14 and capstan surfaces 12, 13 may be machined from a single solid block such as a block of steel. In larger sizes the capstan surfaces 12, 13 may be formed from a hollow cylinder, connected to a hub that is keyed to the shaft 14 in a known manner. An endless strand 18 is wrapped with a sufficient number of turns around each of the surfaces 12, 13 so that capstan effect will prevent slippage even if lubricants should wet the surfaces and reduce the coefficient of friction.

A sheave 19 is keyed to the shaft 18 on the opposite side of the member 17 for the purpose of transmitting the load generated by the apparatus 10 to a desired point of application. A chain sprocket gear, pinch roll, or other transmission means may, however, be substituted for the sheave 19 within the scope of my invention, as convenient.

In FIGS. 1, 2 and 3 the strand 18 is seen to be wrapped around both the capstan surfaces with a left-hand direction of lay. When, facing the cylinder 11 from the sheave 19, the cylinder is rotated counterclockwise the rotation will have the effect of withdrawing strand from the smaller capstan surface 12 over guide sheaves 21, 22 onto the larger capstan surface 13, and returning the strand from the larger capstan, by means of guide sheaves 23, 24, 25, to the smaller capstan.

The difference in the diameters of the capstan surfaces 12 and 13 is greatly exaggerated in the drawing, for the sake of clarity. In practice, this difference is governed by the nature of the strand 18, since too great a difference in diameters would have the effect of stretching the strand beyond its elastic limit or yield point as it leaves the smaller capstan surface 12. Generally speaking, the strain that can be tolerated without permanent elongation of strand material will vary in a manner that can be determined for the material selected and the difference in diameters is chosen accordingly. For metal strands I prefer a diameter difference of about 0.1 percent, so that if the surface 13 has a diameter of 2inches, the surface 12 can readily be formed by machining a 1-mil cut in the surface and with a 6-foot diameter the surface is machined down 36mils. When the cylinder 11 is turned the repeated elongation of the strand 18 causes it to rise in temperature and this, in turn, accounts for some elongation. I prefer to use low coefficient of expansion metals for the strand 18 such, particularly, as the commercially available alloy of 36weight percent nickel and 64weight percent iron.

Instead of metal, a polymeric fiber, such as nylon, can be used for the strand 18. In this case a difference in diameters as high as 2percent can be tolerated, so that for a 2-inch cylinder a surface cut of 20mils can be taken to form the surface 12.

In the embodiment of FIGS. 1—3 the braking effect of my apparatus is due to the fact that work is required to stretch the strand as it advances from the smaller to the larger diameter capstan. On leaving the capstan surface 13, since the strand has not exceeded its elastic limit, it relaxes and returns to its original length. In order, however, to prevent the strand from slipping, some small tension must be maintained in the passage over the sheaves 23, 24, 25 and I supply this tension by means of a spring-mounted sheave 26. The cylinder 11 should be turned only in one direction, so that where the manner of its application might offer the possibility of reverse rotation, this is prevented by means of ratchet teeth 27, on the sheave 19, and a spring pawl 28.

Although the apparatus of FIG. 1—3 generates a braking effect by stretching the strand 18 rather than relying on friction as with usual braking means, there is some frictional effect resulting from the axial movement of the turns of strand on the cylindrical surfaces. The shoes 29, 31 serve to urge the turns of strand along the surfaces and prevent any overlapping. This axial friction is prevented by my structure of FIG. 5 employing double grooved capstans, as shall be explained.

Figure 4:
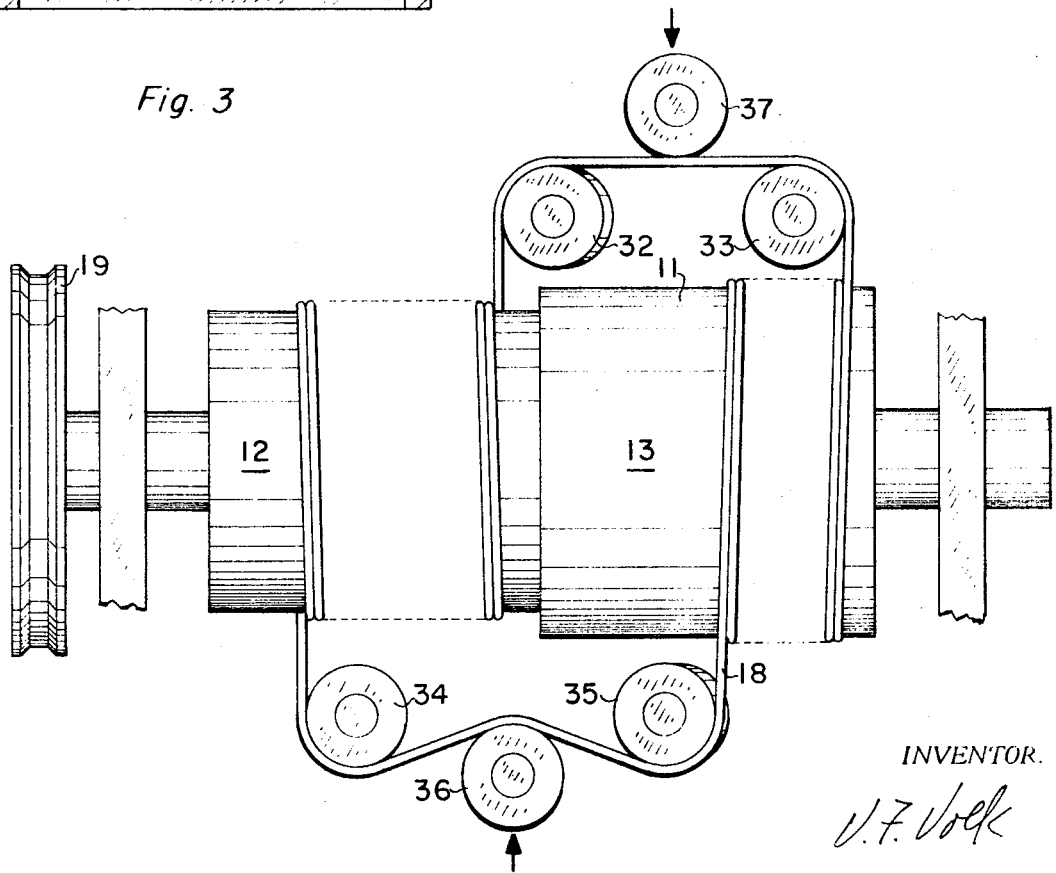
FIG. 4 shows a side view of another embodiment of may invention.
Figure 5:
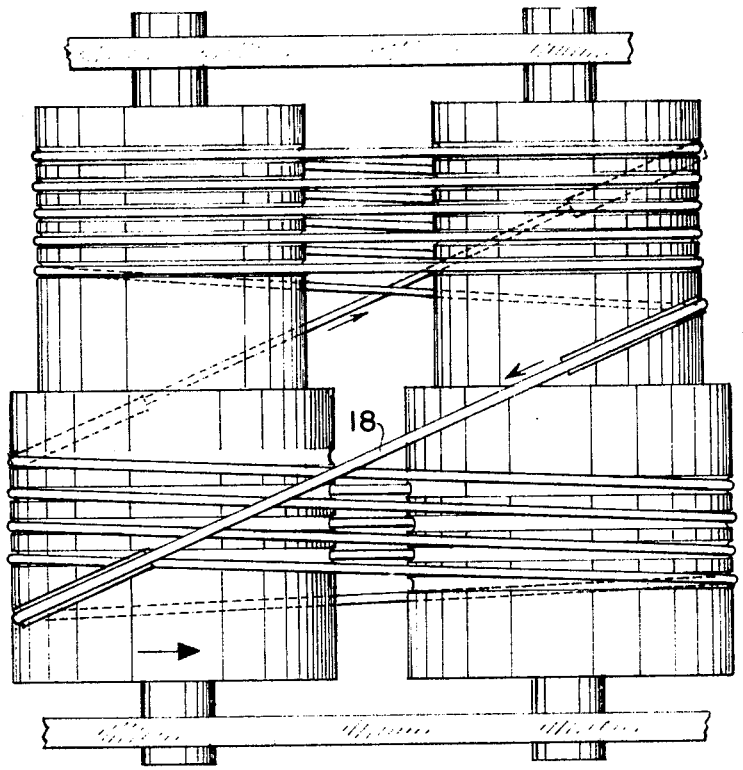
FIG. 5 shows a plan view of a modification of the embodiment of FIG. 4.

In the embodiment of FIGS. 1—3 the strand has the same direction of lay on both capstan surfaces, and the cylinder 11 is rotatable in only one direction. In FIG. 4, however, I show an embodiment that will have the desired braking effect in either clockwise or counterclockwise rotation. Here the strand 18 is wound in a right-hand direction of lay on the smaller diameter surface 12 and a left-hand direction on the larger diameter surface 13 with guide sheaves 32, 33, 34, 35 mounted to provided enough free length of the strand for two tensioning sheaves 36, 37 between the guide sheaves. When the cylinder 11 is turning counterclockwise (as seen from the sheave 19) strand will be slack against the sheave 37 and if the cylinder is run clockwise it will be slack against the sheave 36. In either case the tension in the strand winding onto the larger diameter surface is so great that the additional effect of the tensioning sheave is insignificant. In FIG. 5 my conception of the reversible principle is illustrated with double grooved capstans that avoid the axial friction of the turns of strand on the capstan surfaces and the need for chocks such as the shoes 29, 31. For the sake of simplicity the tensioning sheaves have been omitted from FIG. 5.

Figure 7:
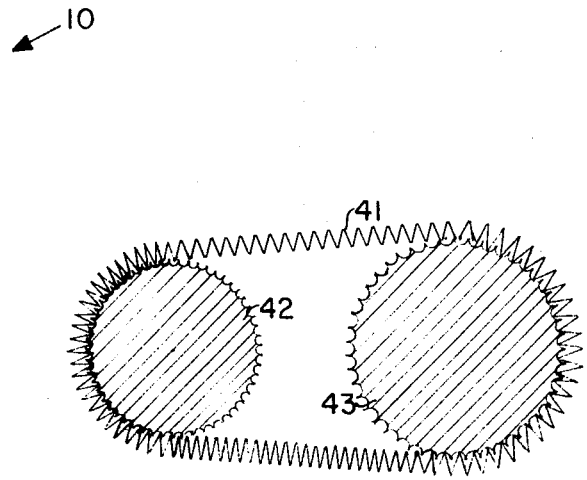
FIG. 7 shows a section through the line 7-7 of FIG. 6.
Figure 6:
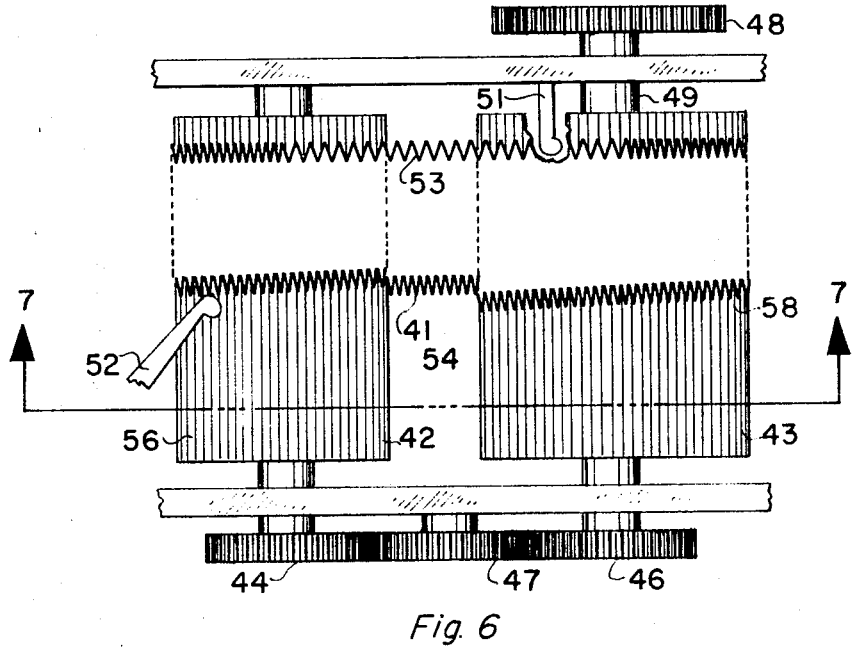
FIG. 6 shows a plan view of another embodiment of my invention.

In FIGS 6 and 7 I have shown an embodiment of my invention particularly adapted for use with a helical spring. Here, an endless coil spring 41 serves as the extensible strand and the percentage elongation within the elastic limit can be much extended. Instead of coaxial cylinders I now employ cylindrical capstans 42, 43 mounted with their axes parallel. In FIG. 6 the capstan 42 has a smaller diameter than the capstan 43 and since they are geared by means of spur gears 44, 46 and idler gear 47 to turn at the same angular speed, the surface speed of the capstan 43 is greater than the surface speed of the capstan 42. This result can be accomplished within the scope of my invention by means of two cylinder capstans of the same diameter geared to rotate at different speeds. It will be further realized that, although I have indicated the use of the spur gears 44, 46, a chain and sprockets or belt and pulleys might also be used within the scope of my invention and are included by the term gear means as used herein. A sprocket 48, keyed to a shaft 49 of the capstan 43, serves to connect the apparatus to any equipment that requires constant braking. The shoes 51, 52 keep the spring 41 moving laterally on the capstans with the result that when the capstans turn clockwise as seen in FIG. 7 the spring is stretched and under relatively high tension at an upper length 53 that is paying onto the larger capstan and under relatively low tension at a lower length 54 that is returning to the smaller capstan 42. By selecting an appropriate size loop for the endless spring 41 slack can be avoided in the length 54 and no tensioning device corresponding to the sheave 37 of FIG. 4 will be required. To improve the traction on the capstan surfaces the capstan 42 is grooved with a plurality of lengthwise ridges 56 spaced to fall between the turns 57 of the spring 41 in its relaxed condition. Similarly the capstan 42 has lengthwise ridges 58 which are wider spaced than the ridges 56 to accommodate the greater extension of the turns of the spring in their stretched condition. It will be appreciated that the gearing 44, 46, 47 will entail some play. This play or looseness is insignificant in the apparatus of FIG. 6 where, due to the use of a spring strand, high extensions are tolerable within the elastic limit. The structure of FIG. 4 is more suitable where a metal wire is used for the strand and the difference in the capstans sizes is in the order of a friction of a percent. By using two capstans on the same axis the need for great precision in the gearing is thus eliminated.

Because of its simplicity, particularly in comparison to electrical braking means such as torque motors, my apparatus is convenient to cool either by blowing air through it or by immersing the entire unit in an oil bath. When the capstans and guide sheaves are constructed of stainless steel and the strand 18 of nickel-iron, the entire apparatus can be immersed in water and the heat of vaporization of the latter used for cooling.

I have invented a new and useful apparatus of which the foregoing description has been exemplary rather than definitive and for which I desire an award of Letters Patent as defined in the appended claims.

I claim:

1. A braking apparatus essentially free from the generation of frictional heat comprising:
   A. an endless strand,
   B. first capstan means having a surface engaging a sufficient length of said strand to prevent slippage of said strand on said capstan means,
   C. second capstan means having a surface engaging a sufficient length of said strand to prevent slippage of said strand on said second capstan means,
   D. first guide means guiding said strand to pay off of said first capstan means and be taken up by said second capstan means,
   E. second guide means guiding said strand to pay off of said second capstan means and be taken up by said first capstan means, and
   F. means driving said first and said second capstan means,
   G. means fixing the surface speed greater for said second capstan means than for said first capstan means in a preselected ratio thereby continuously braking said driving means by straining said strand leaving said first capstan means, while permitting relaxation of said strand leaving said second capstan means,
   H. said strand being elastic within a limit of strain and the strain of said strand leaving said first capstan means not exceeding said limit.

2. The apparatus of claim 1 comprising tensioning means applying tension to said strand being taken up by said first capstan means.

3. The apparatus of claim 1 wherein said strand comprises a helical spring.

4. The apparatus of claim 1 wherein said first and second capstan means comprise coaxial cylinders having a common angular speed and different diameters.

5. The apparatus of claim 4 wherein said strand is wound around each of said capstan cylinders with a different direction of lay.

6. The apparatus of claim 4 wherein said strand is wrapped around both of said cylinders with the same direction of lay.

7. The apparatus of claim 6 comprising means preventing the rotation of said cylinders in one direction.

8. The apparatus of claim 4 comprising tensioning means applying tension to said strand being taken up by said first capstan means.

9. The apparatus of claim 8 wherein said strand is wound around each of said capstan cylinders with a different direction of lay.

10. The apparatus of claim 8 wherein said strand is wrapped around both of said cylinders with the same direction of lay.

11. A braking apparatus essentially free from the generation of frictional heat comprising:
   A. an endless strand, B. a first and a second cylindrical capstan rotatably mounted on parallel axes,
C. means for rotating said capstans,
D. gear means connecting said first capstan and said second capstan in such a manner that said capstans being rotated, the surface speed of said second capstan exceeds the surface speed of said first capstan, and
E. said strand being wrapped around both of said capstans so as to advance under high tension from said first to said second capstan and return under low tension from said second to said first capstan, thereby braking the rotation of said capstans.

12. The apparatus of claim 11 wherein said strand comprises a helical spring.

13. The apparatus of claim 12 comprising lengthwise surface ridges on at least one of said capstans matching the turns of said spring.

14. The apparatus of claim 13 comprising said ridges on both of said capstans, the ridges on said second capstan being spaced wider than the ridges on said first capstan.